(No Model.)
H. T. BASIM.
SAW MILL DOG.
No. 360,268. Patented Mar. 29, 1887.
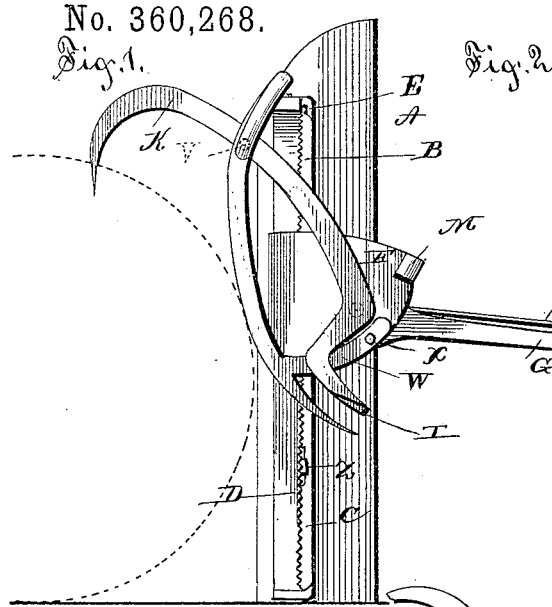
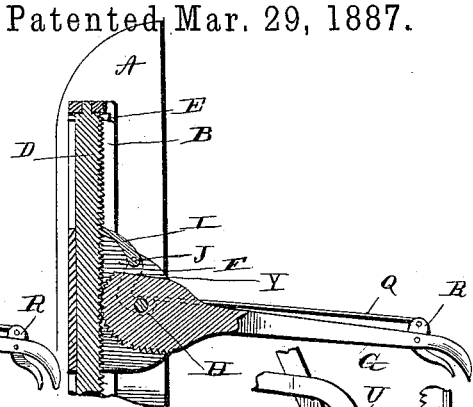
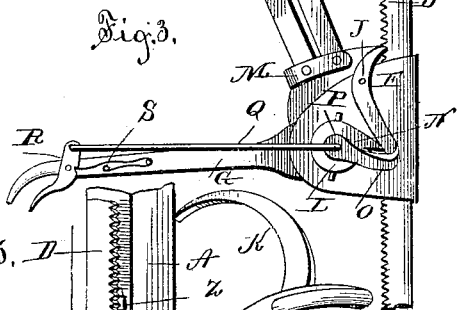
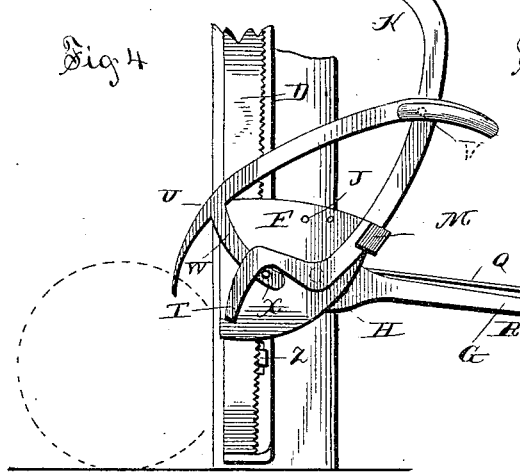
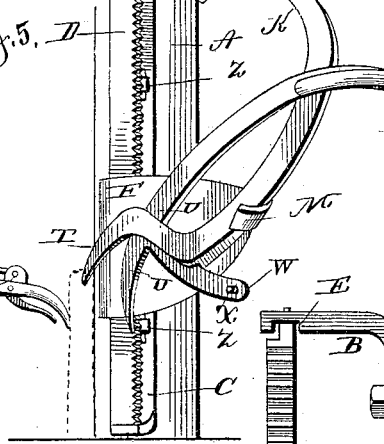
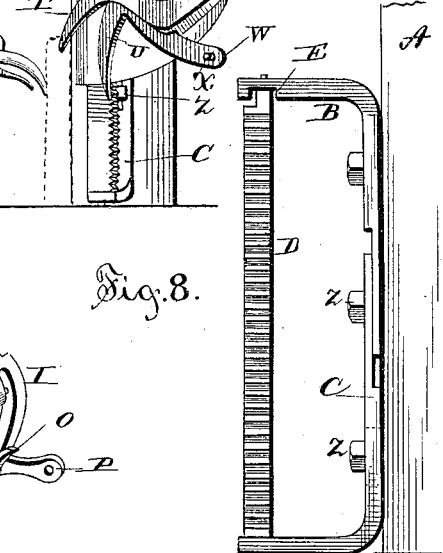
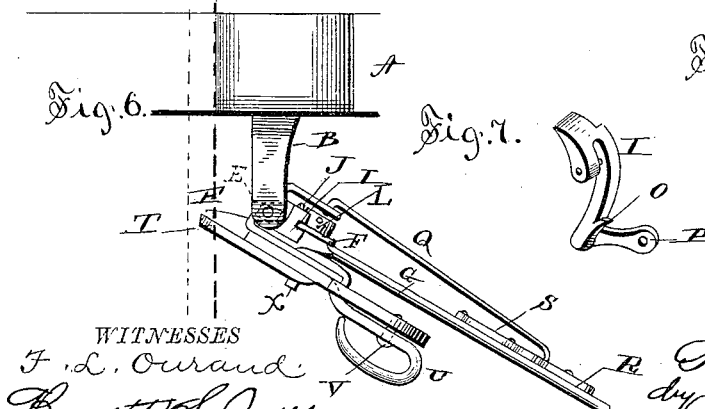
WITNESSES
INVENTOR
Henry Thomas Basim
by Louis Bagger & Co.
Attorneys

UNITED STATES PATENT OFFICE.

HENRY THOMAS BASIM, OF DECATURVILLE, OHIO.

SAW-MILL DOG.

SPECIFICATION forming part of Letters Patent No. 360,268, dated March 29, 1887.

Application filed September 20, 1886. Serial No. 214,024. (No model.)

*To all whom it may concern:*

Be it known that I, HENRY THOMAS BASIM, a citizen of the United States, and a resident of Decaturville, in the county of Washington and State of Ohio, have invented certain new and useful Improvements in Saw-Mill Dogs; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved dog as used with a large log. Fig. 2 is a vertical section through the rack and the inner end of the operating-lever. Fig. 3 is an elevation of the rear side of the dog, showing the detent and its operating mechanism, the large dog being thrown back against its rest. Fig. 4 is a side elevation showing the dog as used upon a small log. Fig. 5 is a similar view showing it used in holding a single board. Fig. 6 is a plan view of the dog in the position shown in Fig. 5. Fig. 7 is a perspective view of the detent, and Fig. 8 is a side elevation of the rack and its retaining-brackets.

Like letters of reference indicate corresponding parts throughout the several figures.

My invention has relation to saw-mill dogs; and it consists in the improved construction and combination of parts constituting the same, as will be hereinafter fully set forth.

Referring to the accompanying drawings, A represents the arm of the head-block, to which the compound dog is secured by means of brackets, the upper bracket, B, being rigidly secured to said arm, and the lower one, C, being adjustably secured to the same. Journaled vertically in the outer ends of these brackets is the rack D, whose rotation is limited by means of the reduced upper end and the sides of the transverse groove E in the upper bracket, Figs. 2 and 8. Embracing this rack and bearing against the smooth edge thereof is a folded plate, F. Upon the outside of the front portion of said plate are attached the dogs proper, and between the ends of the plate are pivoted the operating-lever G on the pintle H and the detent I on the pintle J. The pintle H has the lower end of the large dog K formed integral therewith at one end, and has a collar, L, pinned to its other end, which projects through the rear portion of the folded plate.

From the upper edge of the forward portion of the plate projects a rest, M, for the support of the large dog when not in use, and to serve as an abutment against which said dog may bear when the other dogs are in use. This large dog is further retained in the position of rest by means of the lip N upon said collar, which engages a shoulder, O, formed upon the lower end of the detent. This detent, Fig. 7, whose main portion is pivoted between the ends of the plate, has a downwardly and rearwardly bent arm, P, through which the pintle J also passes. To the outer end of said arm is connected a rod, Q, which leads along toward the handle end of the operating-lever, and is connected to the trip-lever R, pivoted to said operating-lever. The trip-lever has a notch in its side, into which fits the end of a plate-spring, S, secured to the side of the operating-lever. The inner end of the operating-lever is formed into a sector-gear, which meshes with the rack and serves as the lever is operated to raise or lower the plate carrying the dogs. The connection between the rod Q and the detent is made in line with the pintle H, so that in the downward movement of the operating-lever the detent will be allowed to act freely without any interference from said rod.

The dog K is formed with a large hook at its upper end, and is adapted for use upon large logs, as shown in Fig. 1, the dotted circle representing a log; and upon the outer face of the lower end of said dog is formed the small dog T, which projects beyond the pivotal point of the large dog and is adapted for holding to the head-block the last board sawed from a log. (See dotted lines, Figs. 5 and 6.)

The intermediate dog, U, is for use upon small logs, and has a looped handle formed at its upper end, through the back portion of which loop this dog is pivoted to the large dog by the pintle V. The engaging end of the intermediate dog when not in use falls between the dog S and the plate F, and said end is prevented from swinging out too far when in operation by means of the arm W and the pin X upon said arm, the pin engaging in the angle of the dog T.

The rack being adapted to a partial rotation provides for swinging the end of the small dog out beyond the face of the head-block arm far enough to engage a board, as illustrated. It also allows the points of the other dogs to be moved to one side or the other if a knot or bad spot in the timber should come opposite the rack; and should the log be suddenly stopped the adaptability of the dogs to swing prevents them from being broken.

The reduced portion Y of the inner end of the lever G provides for disengaging the sector-gear from the rack as the outer end of the lever is raised. In this position of the lever, the detent being also disengaged from the rack, the folded plate, with the dogs, may be raised or lowered to any part of the rack.

In securing timber to the head-blocks the dog to be used is thrown out over the timber and the plate lowered till the point of the dog touches the timber. Then by depressing the outer end of the lever the dog is forced into the timber and held there by the detent till said detent is tripped by the trip-lever and the operating-lever raised, when the dog may be loosened from its hold.

The lower bracket, C, is rendered adjustable by means of the slots formed therein, through which pass the securing-bolts Z, thus providing for inserting the rack in the brackets and for compensating wear.

Having thus fully described my invention, I claim—

1. The combination of a head-block, a rack pivotally secured thereto, a plate adapted to slide upon said rack, a bar pivotally secured to said plate, having a large dog at its upper end and a small dog at its lower end, said small dog projecting beyond the pivotal point of said bar, and an operating-handle.

2. The combination, with the arm of a head-block, of a bracket rigidly secured at the upper end of said arm, a corresponding bracket adjustably secured near the lower end of the same, a rack pivoted in the outer ends of said brackets, and a dog adapted to vertical adjustment upon said rack.

3. The combination, with the arm of a head-block, of brackets secured thereto, the upper one of which is provided with a transverse groove, a rack journaled in said brackets, the upper end of said rack being reduced and fitting in and adapted to engage with the sides of said groove and limit the rotation of said rack, and a dog adapted to vertical adjustment upon said rack.

4. The combination, with the head-block, of a rack secured thereto, a folded plate embracing said rack, a rest secured to the upper edge of said plate, a dog formed integral to the end of a pintle passing through the ends of said plate, an operating-lever pivoted between said plates upon said pintle, and a detent, also pivoted between said plates.

5. The combination, with the rack, the folded plate, a dog pivoted to said plate, and an operating-lever, of a detent pivoted between the ends of said plate and provided with a downwardly and rearwardly projecting arm, a rod connected to said arm, a trip-lever pivoted to said operating-lever and connected to said rod, and a spring bearing against said trip-lever.

6. The combination, with the rack, the folded plate, a dog pivoted to said plate, and an operating-lever, of a detent pivoted between the ends of said plate and provided with a shoulder, and a collar provided with a lip, said collar being pinned to that pintle which is integral with the large dog.

7. The combination, with the rack, folded plate, operating-lever, detent, and large dog, of an intermediate dog pivoted to said large dog and provided with an arm near its lower end, from which projects a pin for limiting the outward movement of the point of said intermediate dog.

8. The combination, with a head-block, of the brackets secured thereto, the lower one of which is adjustable, the rack journaled in said brackets, the folded plate with a rest at its upper edge, the operating-lever with sector-gear reduced upon one side, the detent with downwardly and rearwardly projecting arm, the rod leading from said arm along said lever, a trip-lever pivoted to said lever, a spring bearing against the trip-lever, the pintle upon which the operating-lever is pivoted, a collar pinned to one end thereof and provided with a lip for engagement with a shoulder upon the arm of the detent, a large dog formed integral with the other end of said pintle, a small dog formed upon the lower end of the large dog, and an intermediate dog pivoted to the large dog and provided with an arm from which projects a retaining-pin.

In testimony that I claim the foregoing as my own I have hereunto affixed my signature in presence of two witnesses.

HENRY THOMAS BASIM.

Witnesses:
AUGUST PETERSON,
WM. SECHER.